United States Patent [19]

Bott

[11] Patent Number: 4,754,905
[45] Date of Patent: Jul. 5, 1988

[54] VEHICLE ARTICLE CARRIER

[76] Inventor: John A. Bott, 931 Lakeshore Dr., Grosse Pointe Shores, Mich. 48236

[21] Appl. No.: 3,134

[22] Filed: Jan. 14, 1987

Related U.S. Application Data

[63] Continuation of Ser. No. 778,385, Sep. 20, 1985, Pat. No. 4,684,048.

[51] Int. Cl.$^4$ ............................................. B60R 9/00
[52] U.S. Cl. ..................................... 224/326; 224/327
[58] Field of Search ................ 224/309, 321, 325, 326, 224/327, 314; 248/346; 296/37.7; 410/104

[56] References Cited

U.S. PATENT DOCUMENTS

| | | |
|---|---|---|
| 1,760,277 | 11/1930 | Seeley et al. |
| 3,181,753 | 5/1965 | Fitch ................................. 224/314 |
| 3,330,454 | 7/1967 | Bott .............................. 224/326 X |
| 3,545,660 | 12/1970 | Stephen ............................ 224/321 |
| 3,623,642 | 11/1971 | Stephen ............................ 224/325 |
| 4,132,335 | 1/1979 | Ingram ............................. 224/326 |
| 4,277,009 | 7/1981 | Bott .............................. 224/321 X |
| 4,341,332 | 7/1982 | Kowalski .......................... 224/326 |
| 4,487,348 | 12/1984 | Mareydt ........................... 224/321 |

Primary Examiner—Henry J. Recla
Assistant Examiner—David Voorhees
Attorney, Agent, or Firm—Harness, Dickey & Pierce

[57] ABSTRACT

An article carrying system for operative association with an automotive vehicle having an exterior generally horizontal surface, such as a trunk lid or roof, the system comprising a pair of elongated support members or slats which have a configuration which flows conformably and aerodynamically into the surface of the vehicle and which are permanently secured to the vehicle. The support members have longitudinally extending channels for supporting adjustable and/or removable components of the system, including tie downs and cross members which components are also provided with aerodynamic designs compatible with the remainder of the system. Provision is also made for association of components of the system, such as cross members, to be fixedly located on the support members. An aerodynamic locking mechanism is also disclosed for use in selected adjustable and/or removable components of the system which includes a hidden actuation mechanism and a hooking action to lock the component to the support member or slat.

8 Claims, 4 Drawing Sheets

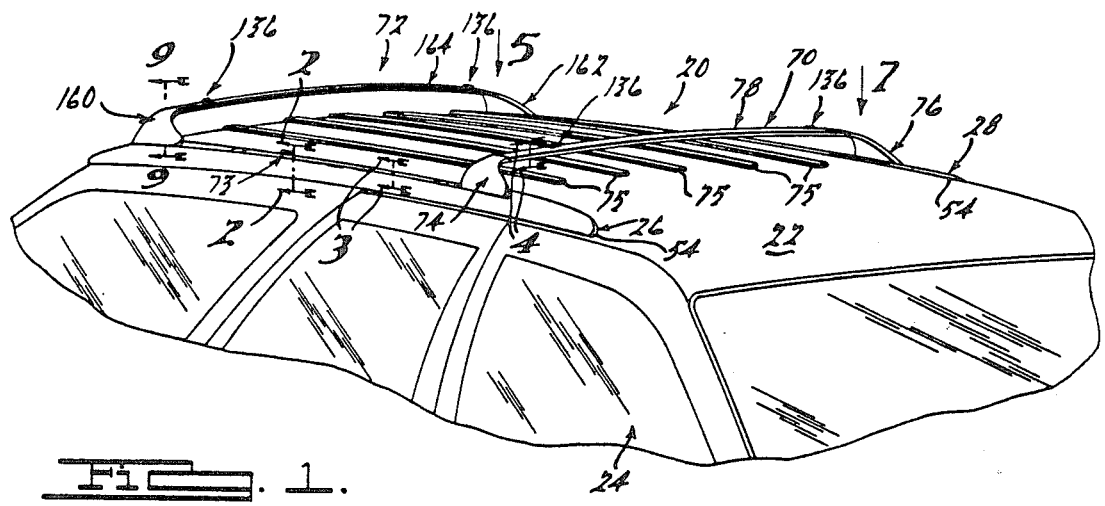
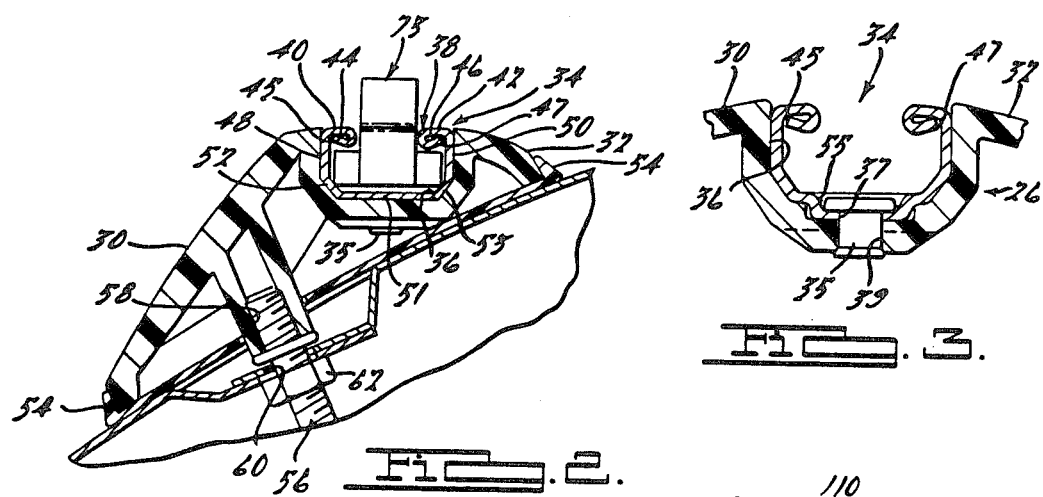
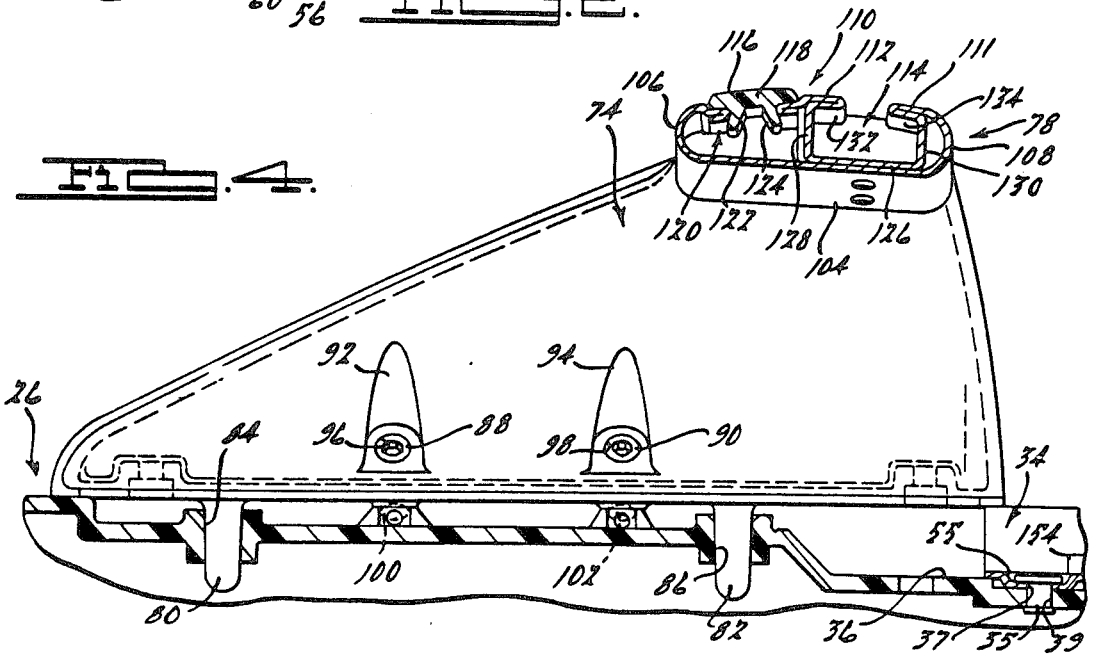

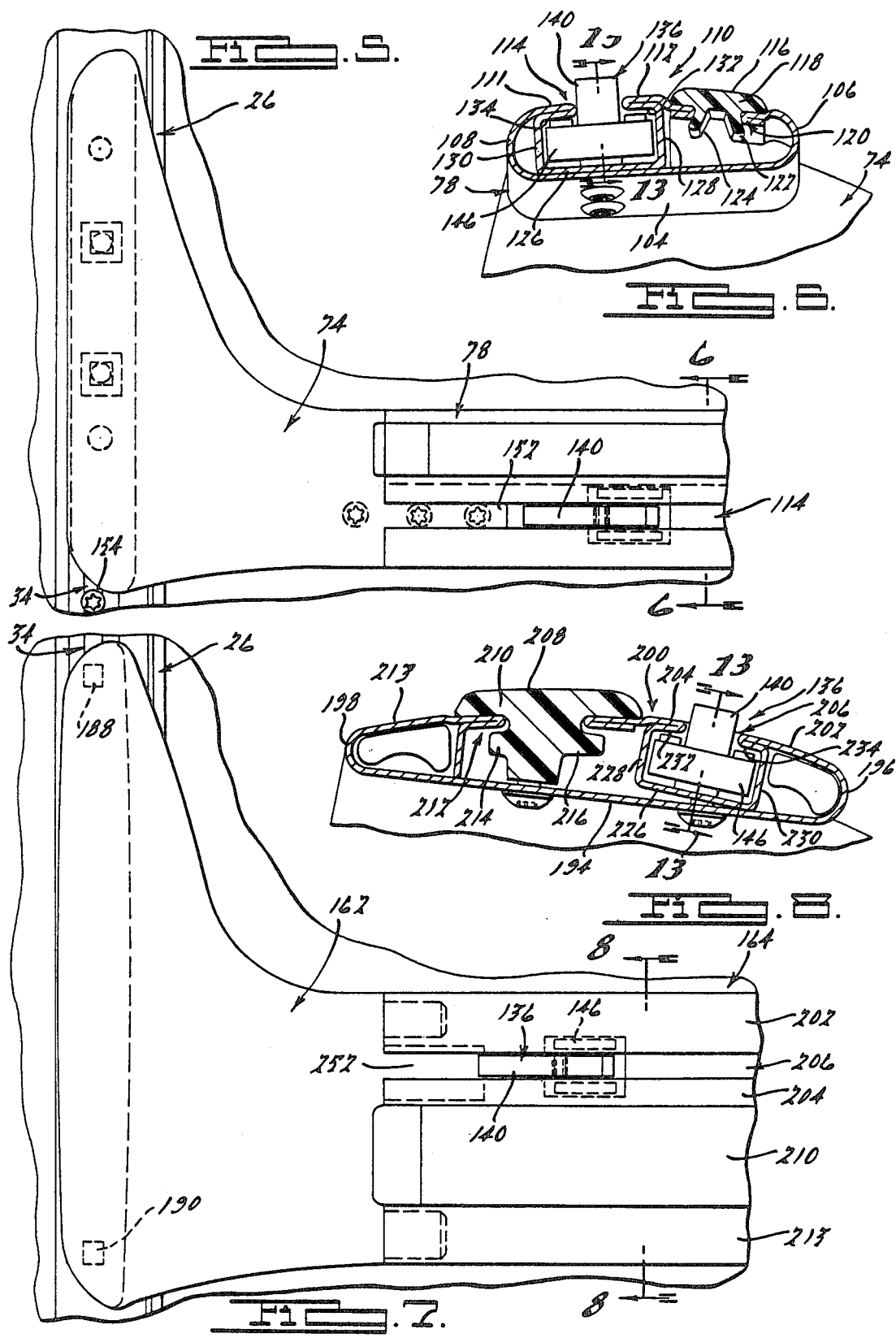

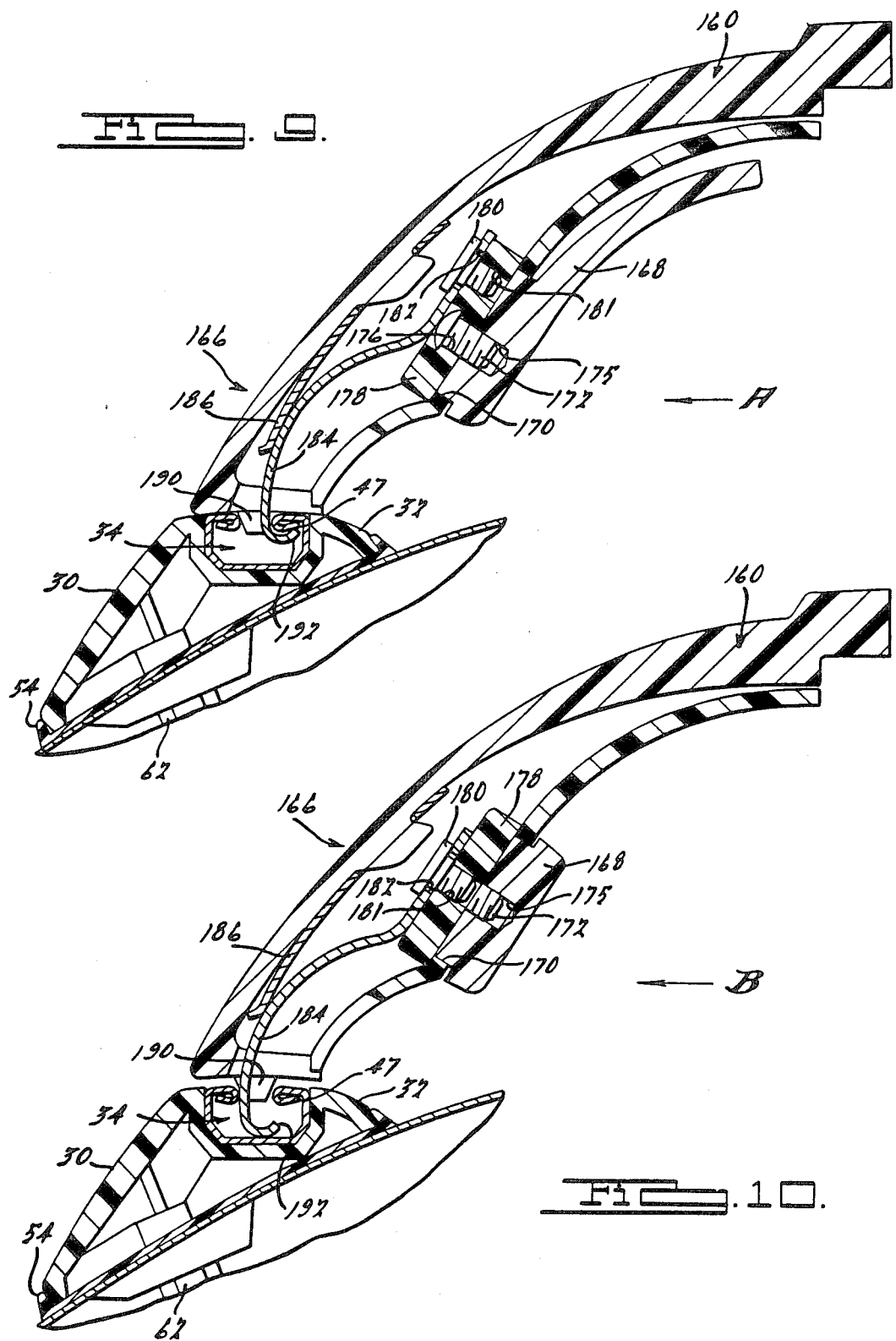

VEHICLE ARTICLE CARRIER

This is a continuation of U.S. patent application Ser. No. 778,385, filed Sept. 20, 1985, now U.S. Pat. No. 4,684,048.

BACKGROUND AND SUMMARY OF THE INVENTION

The present invention relates generally to vehicle article or luggage carriers and more particularly to a new and improved vehicle luggage carrier of the type shown in applicant's U.S. Pat. No. 4,099,658, issued July 11, 1978. Generally, the article carrier of the present invention is of the type which comprises two or more slat-type elements which are fixedly secured to an exterior horizontal surface of an automotive vehicle, such as a vehicle roof or a trunk lid, and which are permanently attached to that surface and adapted to have ancillary article constraining members removably and/or adjustably secured thereto and includes a system of adjustable and fixed components which cooperate with one another and which may be removable in some instances.

The present invention has as one principle object to provide a luggage rack with slidably adjustable and fixedly engageable components including slidably adjustable cross members having tie downs for boxes, luggage, and the like associated with the cross members. The cross members and tie downs of the present invention are not only adjustable but also may be either removable from the luggage carrier or stored within other components of the luggage carrier substantially out of view. Each cross member may include at least one tie down and/or abutment member for optimum securement of articles or luggage to the article carrier and thereby the vehicle.

A significant advantage of the article carrier of the present invention is that the article carrier has a low profile when not in use with minimal structure projecting above the plane of the vehicle surface to which the article carrier is attached, thereby minimizing any adverse wind noise or fuel economy effects that would exist with any portion of the carrier being substantially vertically elevated.

The present invention further incorporates all of the aesthetically appealing features and the myriad of functional features and optional accessories disclosed in the slat-type luggage carriers of applicant's prior patents, such as that described in U.S. Pat. No. 4,099,658, referenced above.

Even more notably, the present invention elevates the aerodynamic design of a vehicle article carrier system having adjustable and/or removable components to an improved design not previously attained by any prior art carriers. The elongated support member or slat of the present invention providing the foundation of the carrier has surfaces which flow into and integrate with the surface of the vehicle, but also includes a channel along which components may be adjusted and/or removably attached.

In cooperation with this improved support member or slat, a new and improved locking mechanism for attaching the adjustable and/or removable components of the system to the member or slat is included having an aerodynamic, hidden release element.

Additional advantages are provided in the combination of the above features with other fixed components of an article carrier system and an improved cross member construction integrating adjustable tie down and/or abutment elements disposeable out of view, similar to those described in applicant's U.S. Pat. No. 4,460,116, issued July 17, 1984, and further integrating a pad construction in a cross rail spaced from a functional channel on load bearing cross members for a more stable yet cushioned load bearing support for articles disposed on the cross members.

Other objects and advantages of the present invention will become apparent from the following detailed description taken in conjunction with the following drawings.

BRIEF DESCRIPTION OF THE DRAWINGS

FIG. 1 is a fragmentary perspective view of an automobile showing an article carrier mounted thereon which is constructed in accordance with the principles of the present invention;

FIG. 2 is an enlarged sectional view of the support member portion of the structure illustrated in FIG. 1 taken along the line 2—2 thereof;

FIG. 3 is an enlarged sectional view of the support member portion of the structure illustrated in FIG. 1 taken along the line 3—3 thereof;

FIG. 4 is an enlarged sectional view of one of the front stanchion portions of the structure of FIG. 1 taken along the line 4—4 thereof;

FIG. 5 is an elevated enlarged fragmentary view of one of the front stanchion assemblies of FIG. 1 taken in the direction of arrow 5.

FIG. 6 is a cross-sectional view of the cross rail portion of FIG. 5 taken along the line 6—6 of FIG. 5;

FIG. 7 is an elevated enlarged fragmentary view of one of the rear stanchion portions of the structure of FIG. 1 taken in the direction of arrow 7;

FIG. 8 is a cross-sectional view of the cross rail portion of FIG. 7 taken along the line 8—8 of FIG. 7;

FIG. 9 is a cross-sectional view of the rear stanchion of FIG. 7 locked to the base support member or slat of FIG. 1;

FIG. 10 is a cross-sectional view similar to FIG. 9 of the rear stanchion of FIG. 7 released from the base support member or slat of FIG. 1;

DETAILED DESCRIPTION OF THE PREFERRED EMBODIMENTS

Figure 11:
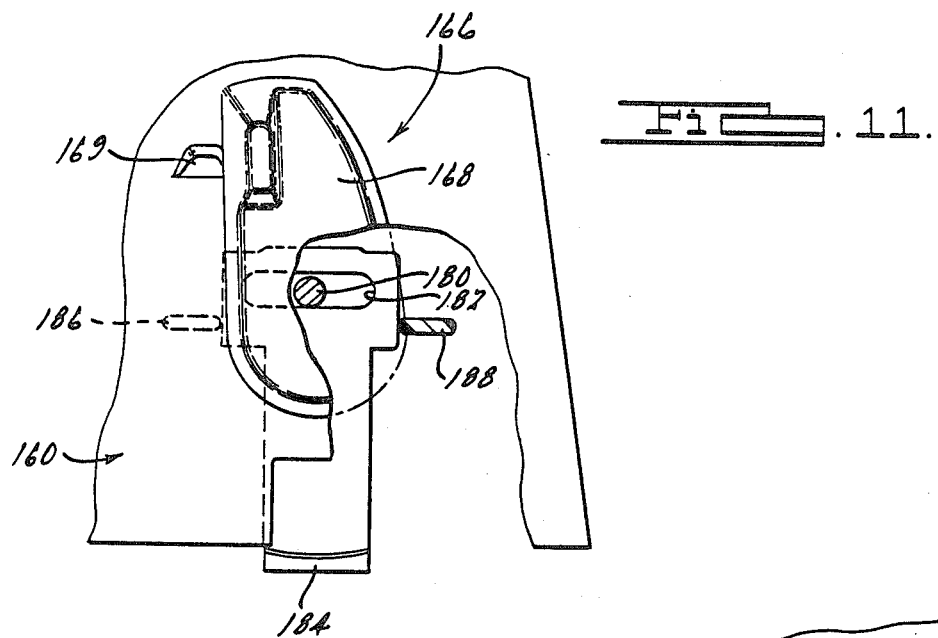
FIG. 11 is a view similar to FIG. 4 of the rear stanchion of FIG. 9 looking in the direction of arrow A in FIG. 9 having portions broken away.

Referring now in detail to FIG. 1 of the drawings, a vehicle luggage carrier 20 is shown in operative association with a generally horizontally disposed roof 22 of a typical automotive vehicle 24. Generally speaking, the luggage carrier 20 comprises a pair of laterally spaced, longitudinally extending support members or slats 26 and 28 which are secured upon the roof 22 at positions adjacent the lateral sides or edges thereof. In the embodiment illustrated, the members 26 and 28 are disposed over the seam where the roof 22 meets the remainder of the body portion of the vehicle, where the roof 22 has a downward curvature, which places the members 26 and 28 adjacent the horizontally extending surface portion of the roof 22. The members 26 and 28 have an external surface configuration that flows aerodynamically and smoothly in the surface of the vehicle 24.

Intermediate portions of the member 26 (or 28) are illustrated in cross-section in FIGS. 2 and 3. The member 26 comprises first 30 and second 32 exterior surfaces having an elongated channel 34 between the surfaces. The channel 34 comprises an elongated recess 36 and a liner 38 disposed in said recess 36 by means of, with reference to FIG. 3, fasteners 35 set through bores 37 in the liner and bores 39 in the recess 36. The liner 38 has upper article supporting surfaces 40, 42 disposed on a pair of inwardly directed upper flanges 44, 46, a pair of sidewalls 48, 50 extending downwardly therefrom, and a base 51 extending between the walls 48, 50 and integrated with the walls 48 and 50 via walls 52 and 53, respectively. The upper flanges 44, 46 are rolled back as illustrated in FIGS. 2 and 3 to provide grooves 45 and 47 in the interior of the channel 34 for the purposes as will be described below. The fasteners 35 are set below the surface of the base 51 by placement in recesses 55, as shown in FIGS. 3 and 4.

Referring to FIG. 2, a pad 54 is disposed between each of the members 26 and 28 and the roof 22. Each member 26 or 28 is secured to the roof 22 by a plurality of threaded collar studs 56 threadably engaged to the member 26 or 28 within a bore 58 and engaged with the roof 22 at the interior of the roof 22 through a plurality of holes 60 in the roof by means of a plurality of nuts 62. The studs 56 engage the members 26 and 28 at the plurality of bores 58 by augering into the members 26 and 28, which are plastic in the preferred embodiment, or by other conventional means. In this manner, the studs 56 are all hidden from view when the members 26 and 28 are assembled on the vehicle.

The article carrier 20 of FIG. 1 further comprises a pair of transversely or laterally extending cross member assemblies 70 and 72 and may also include a tie down 73 and a plurality of intermediate supporting slats 75. The front cross member assembly 70 comprises a pair of stanchions 74 and 76 telescopically engaged with and secured to a front cross rail 78. Referring to FIG. 4, the stanchion 74 (and likewise 76) is fixedly secured to the support member 26 (and 28) via two posts 80 and 82 which fit into two bores 84 and 86 at the front portion of each of the members 26 and 28 and via two bolts 88 and 90 fitting through recesses 92 and 94 and apertures 96 and 98 in each of the stanchions 74 and 76 into corresponding threaded bores 100 and 102 in the members 26 and 28.

The stanchions 74 and 76 have an aerodynamically streamlined curvature as illustrated in FIGS. 1, 4, and 5 and telescopically engage the front cross rail 78 in a similarly aerodynamically streamlined manner. Referring to FIGS. 4 and 6, the cross rail 78 comprises a bottom surface 104 from which a curved leading surface 106 and a curved trailing surface 108 extend upwardly. The upper surface 110 of the cross rail 78 comprises a series of elongated article supporting surfaces including surfaces 111 and 112 disposed one on each side of an elongated first channel 114 and a surface 116 disposed on an elongated front bumper 118 set into a second channel 120 in the rail 78. The bumper 118 has a pair of elongated flanges 122 and 124 on the underside thereof to secure the bumper in the second channel 120.

Figure 13:
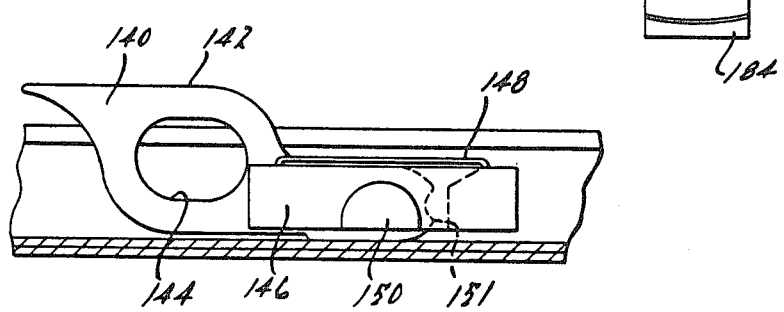
FIG. 13 is a vertical sectional view of either FIG. 6 or FIG. 8 along the line 13—13 of either view of the tie down disposed in the cross rail of either view.

Referring to FIGS. 4 and 6, the first channel 114 has an interior cross-section having a base 126, a pair of sidewalls 128 and 130, and a pair of interior clamping surfaces 132 and 134. Within the first channel 114 (FIG. 6) is disposed a tie down/positioning member 136 similar to that disclosed in applicant's U.S. Pat. No. 4,460,116, issued July 17, 1984. The tie down/positioning member 136 (FIGS. 6 and 13) is comprised of an upper section 140 having a vertically disposeable abutment surface 142 and an aperture 144 therein, a base portion 146 including spring biasing members 148, and a pivot 150 for pivotably associating the upper section 140 with the base portion 146. The upper section 140 also includes a lower cam member 151 on the opposite side of the pivot 150 which engages the base 126 of the first channel 114 with pivotal movement of the upper section 140 from the horizontal to the vertical and clamp the biasing members 148 against the clamping surfaces 132 and 134 and lock the tie down/positioning member 136 in any selected position along the length of the first channel 114. The ends of the channel 114 also include an abutment 152 (FIG. 5) to aid in disposing the upper section 140 from the horizontal to the vertical.

Figure 12:
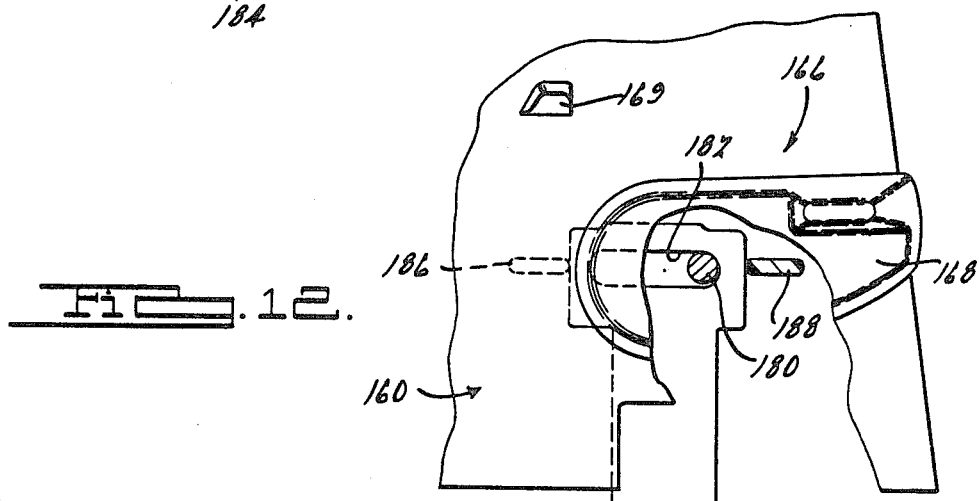
FIG. 12 is a view similar to FIG. 11 of the rear stanchion of FIG. 10 looking in the direction of arrow B in FIG. 10 having portions broken away.

The rear cross member assembly 72 is adjustable to any selected position along the length of the members 26 and 28, as determined by a stop 154 (FIGS. 4 and 5) or by the end of the channel 34, and may also be removed, if desired. The assembly 72 (FIGS. 1 and 7) comprises a pair of stanchions 160 and 162 telescopically engaged with and secured to a rear cross rail 164. The stanchions 160 and 162 each engage a corresponding support member 26 or 28 at the channel 34 thereof via a locking mechanism 166 (FIGS. 9 through 12). The locking mechanism 166 comprises a pivoted lever 168 mounted to each stanchion 160 or 162 within a recess 170 and secured to a pin 172. The lever 168 is limited in movement by a stop 169 (FIG. 11) to indicate a vertically disposed position for the lever 168. The pin 172 threadably engages the lever 168 in a bore 175 and communicates with the interior 174 of the stanchion and engages an eccentric member 178 disposed in the stanchion interior 174 via a bore 176 at a position offset from the center of the member 178 to eccentrically move a pin 180 mounted on the member 178 at bore 181. Referring to FIGS. 11 and 12, the pin 180 moves within a yoke 182 which is integrated with a hook 184. Guides 186 and 188 may be disposed one on each side of the yoke 182 to stabilize the linear vertical movement of the hook 184. The hook 184 is formed with a curvature to permit some resiliency. Further tension is applied to the hook 184 by a tensioning member 186 fixedly disposed adjacent the path of movement of the hook 184 as illustrated in FIGS. 9 and 10.

In operation, the stanchion 160 or 162 is placed over the channel 34 of the support member or slat 26 and the hook 184 is placed within the channel 34. The stanchion 160 or 162 also includes front and rear alignment posts 188 and 190 (FIG. 7) which are also placed within the channel 34 as the stanchion is set upon the upper surfaces 40 and 42 of the member 26 or 28. Once alignment is attained, the lever 168 is rotated from a horizontally disposed position (FIG. 10) to a vertically disposed position (FIG. 9) abutting against the stop 169 and lifting the hook 184 so that its leading edge 192 is engaged with the groove 47 of the channel 34 to clamp the stanchion 160 or 162 to the support member or slat 26. The return of the lever 168 to a horizontal disposition releases the hook 184 and the stanchion 160 or 162 from the member or slat 26 for adjustment or removal.

Referring to FIGS. 7 and 8, the rear cross rail 164 is similar to the front cross rail 78 in that it has a bottom surface 194 from which a curved leading surface 196 and a curved trailing surface 198 extend upwardly. It should be noted that the leading surface 196 and trailing surface 198 may be reversed, however, depending upon the selected placement of the rear cross rail assembly 72 on the members 26 and 28. The upper surface 200 of the cross rail 164 comprises a series of elongated article supporting surfaces including surfaces 202 and 204 disposed one on each side of an elongated first channel 206, a surface 208 disposed on an elongated front bumper 210 set into a second channel 212 in the rail 78 and an additional surface 213. The bumper 210 has a pair of elongated flanges 214 and 216 on the underside thereof to secure the bumper in the second channel 212.

Referring to FIG. 8, the first channel 212 has an interior cross-section having a base 226, a pair of sidewalls 228 and 230, and a pair of clamping surfaces 232 and 234. Within the first channel 212 is disposed a tie down/positioning member 136 again similar to that disclosed in applicant's U.S. Pat. No. 4,460,116, issued July 17, 1984. The tie down/positioning member 136 is again comprised of an upper section 140 having a vertically disposeable abutment surface 142 and an aperture 144 therein, a base portion 146 including spring biasing members 148, and a pivot 150 for pivotably associating the upper section 140 with the base portion 146. The upper section 140 also includes a lower cam member on the opposite side of the pivot 150 which engages the base 226 of the first channel 212 with pivotal movement of the upper section 140 from the horizontal to the vertical and clamp the biasing members 148 against the clamping surfaces 232 and 234 and lock the tie down/positioning member 136 in any selected position along the length of the first channel 212. The ends of the channel 212 also includes an abutment 252 (FIG. 7) to aid in disposing the upper section 140 from the horizontal to the vertical.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. In an article carrier adapted to be secured to a motor vehicle adjacent to a generally horizontally extending body surface, said carrier including adjustable components having locking means, a slat having first and second external surfaces, means for fastening said slat to said vehicle on a surface not parallel with a horizontal plane, and a longitudinally extending channel member at least coextensive with said slat and having an opening disposed between said first and second surfaces, said channel member having a base, a pair of sidewalls, and a pair of flanges directed toward one another having upper surfaces on one side of each flange disposed in a substantially horizontal plane and means for operably engaging said locking means on the other side of each flange interior of the channel wherein when mounted to said vehicle said slat disposes said flanges wherein the vertical distance from one of said flanges to said body surface is greater than the vertical distance of the other of said flanges to said body surface.

2. A slat in accordance with claim 1, wherein said fastening means is hidden when said slat is mounted on said vehicle.

3. A slat in accordance with claim 1, wherein said slat includes at least one portion extending below the contour of the adjacent roof surface.

4. In an article carrier adapted to be secured to a motor vehicle adjacent to a generally horizontally extending body surface, said carrier including adjustable components having locking means, a slat having first and second external support surfaces, means for fastening said slat to said vehicle on a surface not parallel with a horizontal plane to dispose said first and second external support surfaces of said slat in a substantially horizontal plane, a longitudinally extending channel disposed between said first and second support surfaces, and means for operably engaging said locking means interior of the channel, wherein the vertical distance from said first external support surface to said body surface is greater than the vertical distance from said second external support surface to said body surface when said slat is mounted to said vehicle.

5. A slat in accordance with claim 4, wherein said fastening means is hidden when said slat is mounted on said vehicle.

6. A slat in accordance with claim 4, wherein said vehicle has a longitudinally disposed center line and said first support surface is a greater distance from said center line than said second support surface.

7. In an article carrier adapted to be secured to a motor vehicle adjacent to a generally horizontally extending body surface, said carrier including adjustable components having locking means, a slat having first and second external surfaces, means for fastening said slat to said vehicle on a surface not parallel with a horizontal plane, and a longitudinally extending channel disposed between said first and second surfaces, said channel comprised of a base, a pair of sidewalls, and first and second flanges directed toward one another each having article supporting surfaces on one side of each flange, said channel including means for operably engaging said locking means on the other side of each flange interior of the channel, wherein the vertical distance from said article supporting surface to said body surface of said first flange is greater than the vertical distance from said article supporting surface of said second flange to said body surface when said slat is mounted on said vehicle.

8. A slat in accordance with claim 6, wherein said fastening means is hidden when said slat is mounted on said vehicle.

* * * * *